(12) United States Patent
Paul et al.

(10) Patent No.: US 7,036,037 B1
(45) Date of Patent: Apr. 25, 2006

(54) MULTI-BIT DESKEWING OF BUS SIGNALS USING A TRAINING PATTERN

(75) Inventors: Somnath Paul, Milpitas, CA (US); Rakesh Mehrotra, San Jose, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 518 days.

(21) Appl. No.: 10/218,239

(22) Filed: Aug. 13, 2002

(51) Int. Cl.
*G06F 1/12* (2006.01)
(52) U.S. Cl. ...................... 713/401; 713/503
(58) Field of Classification Search ........... 713/401, 713/503
See application file for complete search history.

(56) References Cited

U.S. PATENT DOCUMENTS

| | | | | |
|---|---|---|---|---|
| 5,313,501 A * | 5/1994 | Thacker | ...................... | 375/369 |
| 5,467,464 A * | 11/1995 | Oprescu et al. | ............. | 713/400 |
| 5,727,021 A * | 3/1998 | Truebenbach | ................ | 375/226 |
| 5,923,198 A * | 7/1999 | Fujioka | ...................... | 327/262 |
| 6,079,035 A * | 6/2000 | Suzuki et al. | ............... | 714/700 |
| 6,636,993 B1 * | 10/2003 | Koyanagi et al. | ........... | 714/700 |
| 6,725,390 B1 * | 4/2004 | Liu et al. | ..................... | 713/401 |
| 2002/0091885 A1 * | 7/2002 | Hendrickson et al. | ...... | 710/100 |
| 2002/0093986 A1 * | 7/2002 | Hendrickson et al. | ...... | 370/503 |
| 2002/0126704 A1 * | 9/2002 | Cam et al. | ................... | 370/503 |
| 2003/0196132 A1 * | 10/2003 | Chiang | ........................ | 713/503 |
| 2003/0217302 A1 * | 11/2003 | Chen et al. | ................. | 713/401 |

* cited by examiner

Primary Examiner—Chun Cao (57) ABSTRACT

A method for multi-bit de-skewing of parallel bus signals is disclosed. The method includes receiving data comprising a multi-bit word and a training pattern. After a first control word of the training pattern is detected, the number of bits needed to de-skew each data bit of a multi-bit data word in each bit-line of a parallel bus is calculated. The number of bits needed to de-skew each data bit of a multi-bit data word in each bit-line of the parallel bus is transmitted to a bit delay line. The system then outputs a de-skewed data word.

20 Claims, 9 Drawing Sheets

MULTI-BIT DESKEWING OF BUS SIGNALS USING A TRAINING PATTERN

TECHNICAL FIELD

Embodiments of the present invention relate generally to multi-bit de-skewing of bus signals. In particular, embodiments of the present invention relate to a method and system for multi-bit de-skewing of parallel bus signals based on training pattern word detection.

BACKGROUND ART

At very high speed, data bits in a parallel bus may exhibit significant skew at synchronization. This is because the transmission of parallel bits of data over long distances is affected by the different propagation delays associated with each of the channels of the parallel bus (e.g., between sender and receiver). This holds true whether the channels are composed of metal or are fiber optic. The difference in propagation delays causes the arrival times of individual data bits at the destination receiver to be different. The difference between the bit arrival times at the receiver is referred to as skew. Where the channel lengths are kept short, the skew effect is not substantial. However, as channel lengths increase, the propagation delay accumulates and the skew increases. Eventually, the increasing channel lengths result in bits from one word drifting into the bits of another word. Once this occurs, the receiver cannot reliably align the bits into their respective words and data corruption and/or data loss may result. Data de-skewing may be required at the receiver before a proper processing of the data may be performed.

A conventional method of de-skewing skewed data signals involves single bit time de-skewing of skewed data signals. Utilizing this method, a skewed data signal is first synchronized to one particular edge of a clock signal and then de-skewed for a single bit skew. However, there may be additional delay introduced from such attempts at synchronization. Also, as may be appreciated, the resulting delay may be large if an improper decision is made in this regard. Additionally, such methods do not allow multiple bit de-skewing over a broad range of bit times. Using such conventional methods the maximum skew that may be corrected is of single bit length. Importantly, these methods do not allow the de-skewing of skewed data signals that are distorted by several bit lengths.

SUMMARY OF THE INVENTION

Thus, what is needed is a method and system which overcomes the limitations of conventional parallel data transmission and reception methods. The solution should accurately and reliably compensate for skew distortion, while providing for reliable parallel data transmission and reception across much longer distances than possible with conventional technology. Moreover, the solution should not rely on the synchronization of skewed data signals with clock signal edges. However, the solution should allow multiple bit de-skewing of skewed data signals over a broad range of bit times.

Accordingly, a need exists for a method and system for providing multi-bit de-skewing of parallel bus signals. The present invention provides a method and system that accomplish this need.

For instance, one embodiment of the present invention provides a method and system for multi-bit de-skewing of parallel bus signals. In one embodiment, de-skewing is performed without the use of a delay buffer. The method includes receiving data including a multi-bit word and a training pattern, monitoring the received data for a first control word of the training pattern, detecting a first control word of the training pattern, calculating the number of bits needed to de-skew each data bit of a multi-bit data word in each bit-line of a parallel bus, and transmitting the number of bits needed to de-skew each data bit of a multi-bit data word in each bit-line of the parallel bus to a bit delay line. The system then outputs a de-skewed data word.

In one embodiment, de-skewing is performed utilizing a delay buffer. According to this embodiment, a multi-bit data word and training pattern is received into a delay buffer. Upon the detection of a first control word of the training pattern the contents of the delay buffer are recorded. After a first control word of the training pattern is detected, the number of bits needed to de-skew each data bit of a multi-bit data word transmitted in each bit-line of a parallel bus is calculated. The number of bits needed to de-skew each data bit of a multi-bit data word in each bit-line of the parallel bus is transmitted to a bit delay line. The system then outputs a de-skewed data word.

In yet another embodiment, the present invention includes a computer-usable medium having computer-readable code embodied therein for causing a computer to perform particular actions as described above to provide multi-bit de-skewing of parallel bus signals using a training control pattern.

These and other advantages of the various embodiments of the present invention will be recognized by those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the various embodiments of the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "monitoring" or "calculating" or "transmitting" or the like, refer to the action and processes of a computer system, or similar electronic computing device, that manipulates and transforms data. For example, the data is represented as physical (electronic) quantities within the computer system's registers and memories and is transformed into other data similarly represented as physical quantities within the computer system memories or registers or other such information storage, transmission, or display devices.

Exemplary Network in Accordance With Embodiments of the Present Invention

Figure 1:
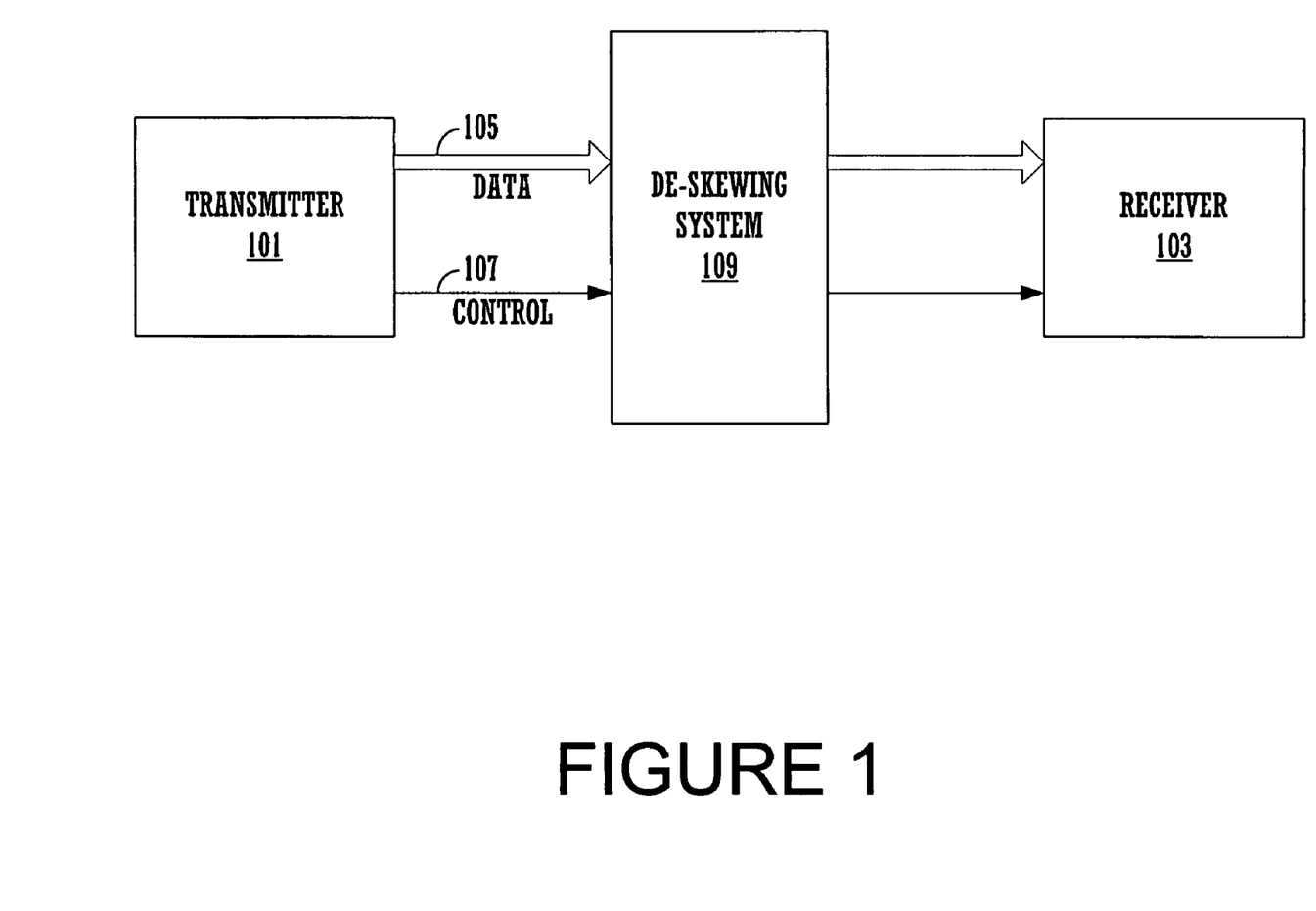
FIG. 1 shows a transmitter receiver combination utilizing a parallel bus data transmission arrangement in accordance with one embodiment of the present invention.

FIG. 1 shows a transmitter/receiver combination 100 employing a parallel bus data transmission arrangement and a de-skewing system 109 in accordance with one embodiment of the present invention. At very high speeds, data bits of a parallel bit data word being transmitted from transmitter to receiver may exhibit significant skew at the receiver. Consequently, data de-skewing may be required at the receiver before data processing is performed. According to one embodiment of the present invention, a fixed training pattern consisting of alternating logic high and logic low level signal components may be transmitted along with transmitted data, and may be used to facilitate bit level de-skewing of skewed data bits.

The training pattern facilitates bit level de-skewing of skewed data bits by providing a reference from which the skew of each of the data bits in a parallel bit data word may be determined. According to one embodiment, the training pattern may consist of 16 repeated sequences of training control words followed by 16 repeated sequences of its complement called training data words. However, according to other embodiments the training pattern may be structured to consist of any fixed ratio of training control and training data words. As discussed herein with reference to FIG. 7, using the control word complement (e.g., training data word) to calculate skew provides a measure of the skew delay from a complemented (re-oriented) reference position.

According to one embodiment, orienting the skew measurement in this manner facilitates the reliable verification of the calculated skew by enabling a direct comparison of the skew thus determined, with the skew determined by measuring the delay between the detection of the last training data word and subsequent bit transitions of a parallel bit data word. Referring to FIG. 1, there is shown transmitter 101, receiver 103, data bus 105, data control line 107, and de-skewing system 109.

More specifically, transmitter 101 transmits data and control bits over parallel bit line data bus 105 and data control line 107 to receiver 103. The data transmitted may exhibit significant skew at the receiver. As previously mentioned, the skewed data bits may be de-skewed using a simultaneously transmitted training pattern. The training pattern enables bit level de-skewing of skewed data bits in a parallel bit line data bus (see discussion of FIG. 7).

Receiver 103 receives and processes parallel bit data word transmissions transmitted from transmitter 101. According to one embodiment, these transmissions may be transmitted via a 16 bit parallel bit line data bus. In alternate embodiments, bus widths employed may include but are not limited to 32 or 64 bit parallel bit line bus widths. It should be appreciated that a plurality of words may be contained in the same bus data path. Because significant skew may be exhibited by the transmitted data bits at the receiver input, de-skewing may be required. Such may be necessary in order that proper processing of the data bits may be performed by the receiver.

Data bus 105 facilitates the transmission of parallel bit data words from transmitter to receiver 103. As previously mentioned, data bits of the multi bit data words being transmitted along such a bus may become significantly skewed requiring substantial de-skewing before undergoing processing.

Data control line 107 facilitates the transmission of a control signal that corresponds to training control word and training data word portions of the training pattern. According to one embodiment, the training pattern may be defined by an SPI-5 interface (not shown). As previously mentioned, the training pattern may in one embodiment consists of 16 repeated sequences of training control words followed by 16 repeated sequences of the training control word's complement (training data words). However, according to other embodiments the training pattern may be structured to consist of any fixed ratio of training control and training data words.

Figure 2:
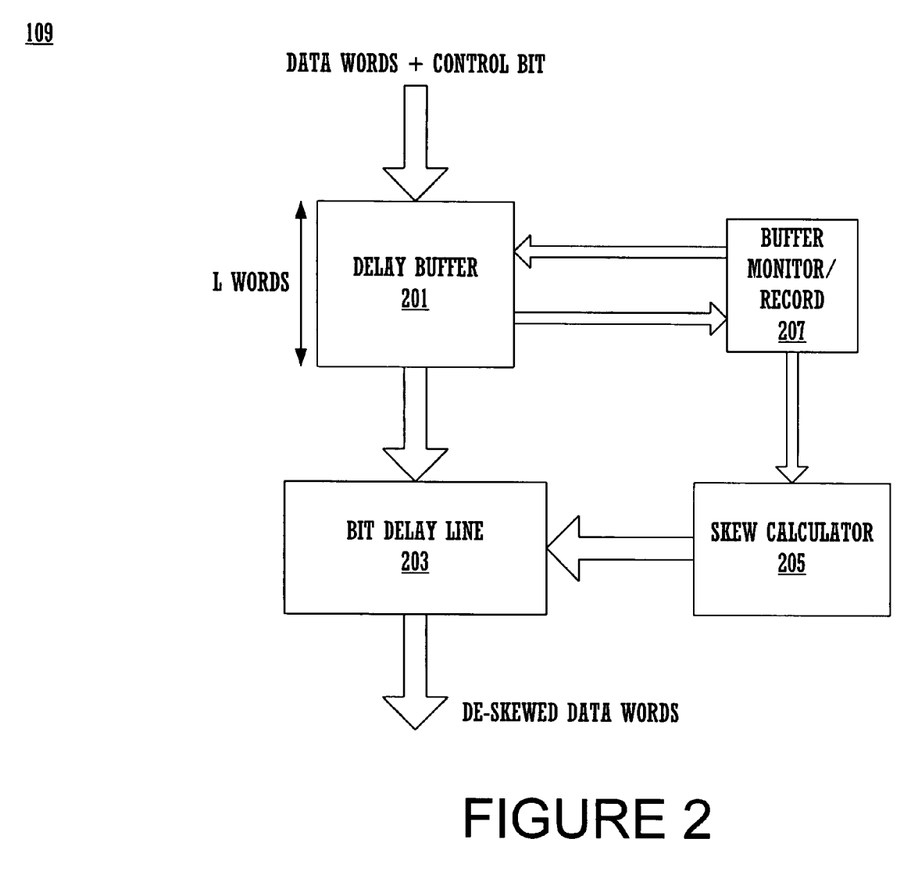
FIG. 2 is a block diagram of a training pattern based de-skewing system in accordance with one embodiment of the present invention.

De-skewing system 109 de-skews the skewed data bits of multi-bit words in the parallel bus (see discussion of FIG. 2 herein). According to one embodiment of the present invention this is facilitated by a training control pattern. The de-skewing of the bits of a multi-bit data word allows proper processing of the data word by receiver 103.

FIG. 2 is a block diagram of a training pattern-based de-skewing system 109 in accordance with one embodiment of the present invention. As discussed above data bits in a parallel bit line data bus being transmitted from a transmitter to a receiver may exhibit significant skew. According to one embodiment of the present invention, a fixed training pattern consisting of alternating logic high and logic low level signal components may be transmitted along with transmitted data, and may be used to facilitate bit level de-skewing of skewed data bits. The training pattern facilitates bit level de-skewing of skewed data bits by providing a reference from which the skew of each of the data bits in a parallel bit data word may be calculated. From this information the number of bits needed to de-skew each bit line may be determined. This information may then be employed to de-skew the skewed data bits.

Referring to FIG. 2 there is shown delay buffer 201 (optional), bit delay line 203, de-skew calculation module 205, and training pattern monitor 207. Optional delay buffer 201 may receive transmitted data and control signal inputs (see FIG. 2). According to one embodiment, delay buffer 201 may receive a multi bit data input plus a single bit control input per clock. The delay buffer may hold a minimum of L words according to one embodiment (see FIG. 2) which is the number of words that correspond to the length of the training pattern. Delay buffer 201 accommodates the storing (recording) of its entire contents for purposes of the herein described skew delay calculation. In an alternate embodiment, de-skewing may be performed without the use of a delay buffer. According to this embodiment, the parallel bit data bus is monitored for the first word of the training control pattern. Once the training control pattern is detected the skew of the data bits of multi-bit words may be determined on a word by word basis. It should be appreciated that according to this embodiment, instead of a buffer snapshot the data path (parallel bus) may be dynamically monitored with the skew delay calculation being based on moving bits of data.

Bit delay line 203 is an individually controlled bit delay line. Bit delay line 203 may receive a multi-bit data word input from delay buffer 201 (as is shown in FIG. 2) or directly from the data bus. The parallel bit data words that are received may exhibit significant skew. According to one embodiment, bit delay line 203 receives an input from bit skew calculator 205 that provides a signal representation of the number of bits needed to de-skew each bit line. Based on the input received from bit skew calculator 205, different delays are selected for each individual bit of a multi-bit data word.

Bit skew calculator 205 calculates the number of bits needed to de-skew data bits in each bit-line. According to one embodiment, this calculation may be based on a snapshot (recording or storing) of the contents of the delay buffer (see discussion of the operation of the calculator made with reference to FIG. 3A). In an alternate embodiment, the calculation is made on a word by word basis (see discussion of the operation of the calculator made with reference to FIG. 3B). According to one embodiment, the calculation may be triggered by the detection of the first word of a training control pattern. The training pattern may facilitate the bit level de-skewing of skewed data bits by providing a reference from which the skew of each of the data bits in a multi-bit data word may be calculated. From this the number of bits needed to de-skew each bit of the data word may be determined. A signal representation of the number of bits needed to de-skew each data word bit may be transmitted from de-skew calculator 205 to bit delay line 203. This information may be used to de-skew data bits that may be skewed in their transmission along the parallel bit line data bus (e.g., 105).

Training pattern monitor 207 monitors the buffer or data bus for the first word of the training control pattern. According to one embodiment, the detection of a first word of a training control pattern triggers a snapshot (recording or storing) to be taken of the entire contents of the delay buffer and a pausing of re-computing of another training control pattern until the detection of the last word of the first training control pattern. According to alternate embodiments, the detection of the first word of a training control pattern triggers the storing of the skew of individual words for purposes of word by word de-skewing. In either case, the training pattern may facilitate the bit level de-skewing of skewed data bits by providing a reference from which the skew of each of the data bits in a multi-bit data word may be calculated.

Exemplary Operations in Accordance With Embodiments of the Present Invention

FIGS. 3A, 3B, 4, and 7 show flowcharts 300A, 300B, 400, and 700 of computer controlled-methods of multi-bit de-skewing of multi-bit data words in accordance with exemplary embodiments of the present invention. The flowcharts include processes of the present invention which, in one embodiment, may be carried out by processors and electrical components under the control of computer-readable and computer-executable instructions. The computer-readable and computer-executable instructions reside, for example, in data storage features such as computer usable volatile memory and/or computer usable non-volatile memory (e.g., 804 and 806 described herein with reference to FIG. 8). However, the computer-readable and computer-executable instructions may reside in any type of computer-readable medium. Although specific steps are disclosed in the flowcharts, such steps are exemplary. That is, the present invention is well suited to performing various other steps or variations of the steps recited in the flowcharts. Within various embodiments, it should be appreciated that the steps of the flowcharts may be performed by software, by hardware or by a combination of both.

Figure 3A:
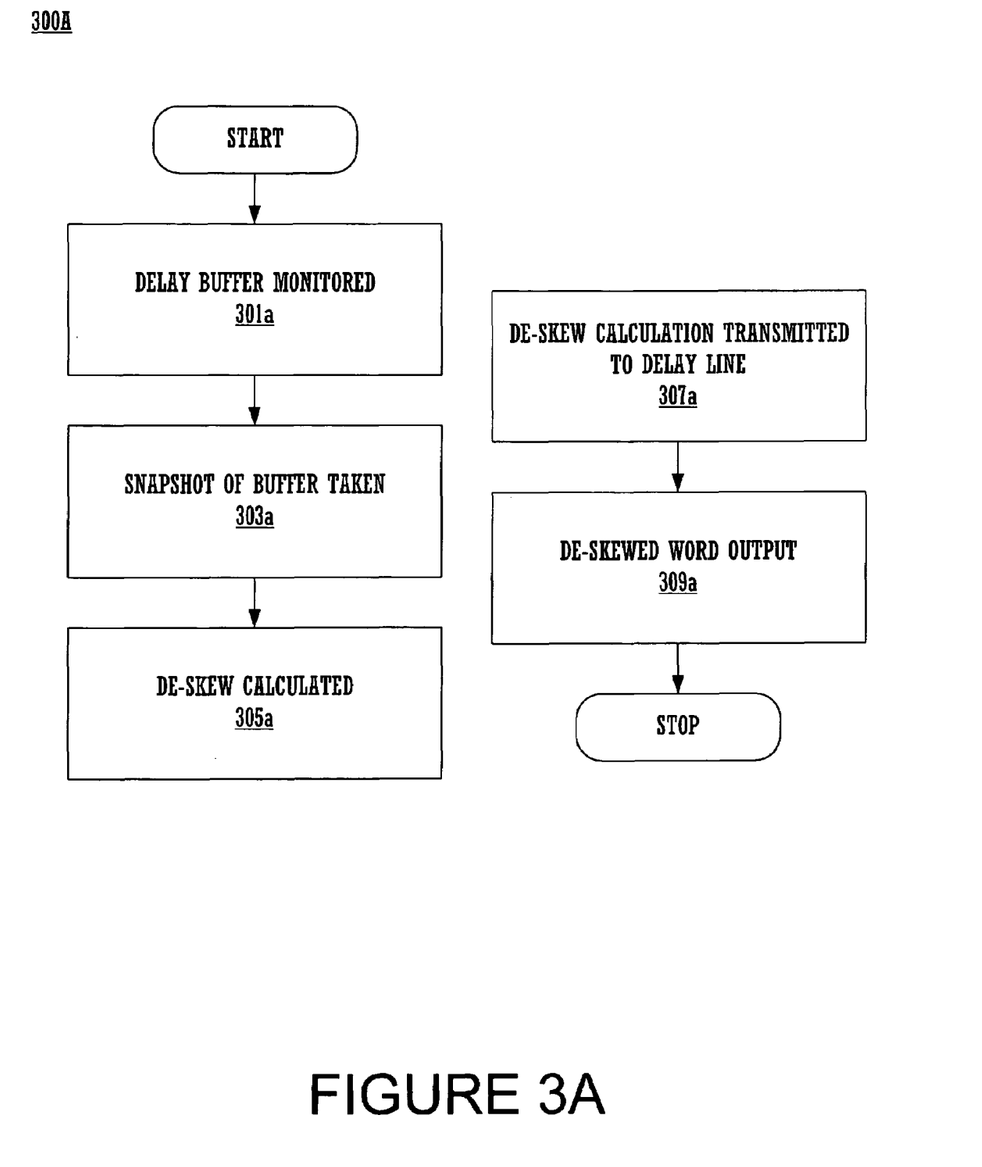
FIG. 3A is a flowchart of a computer-controlled method for calculating skew based on a training control pattern according to one embodiment of the present invention.

FIG. 3A is a flowchart 300A of the steps performed in a computer controlled method for calculating skew based on the detection of a training control pattern according to one embodiment of the present invention. According to one embodiment, the detection of a training control pattern triggers a skew calculation process that produces a calculation of the number of bits needed to de-skew each bit of a transmitted multi bit data word. This information may be transmitted to an individual bit delay line (e.g., 203, FIG. 2)

which selects different delays for the individual bits of a multi-bit data word and results in the de-skewing of the skewed data bits of the multi-bit data word.

At step 301A of FIG. 3, a delay buffer is monitored for the presence of the first word of a training control pattern. The first word (training control word) of the training control pattern provides a reference from which a skew contour of a multi-bit data word may be established, although the actual skew of the multi-bit data word may be calculated using a training data word. Training control words and training data words are related as complements.

At step 303A, upon detection of the first word (training control word) of a training control pattern, a snapshot (recording or storing) of the contents of the entire buffer is taken. This snapshot records the locations of the positions of the words of the training control pattern in the delay buffer. The training control word position provides a reference from which a skew contour may be established. According to one embodiment, the complement of the training control word (training data word) is used to calculate the skew of each bit of a multi-bit data word, and thus the number of bits needed to de-skew each bit of the multi-bit data word (see discussion of delay calculation made with reference to FIG. 4 below).

At step 305A of FIG. 3, the number of bits needed to de-skew each bit of a multi-bit data word is calculated. This calculation may be based on the detection of the first training control word and the snapshot of the buffer taken in step 303A. As previously mentioned, the complement of the training control word (training data word) may be used to actually calculate the skew of each bit of the multi-bit data word, and thus the number of bits needed to de-skew each bit of the multi-bit data word. This per-bit calculation allows the multiple bit de-skewing of skewed data bits of a multi-bit data word (see FIG. 4 discussion below).

At step 307A, the information calculated in step 305A is transmitted to the bit delay line, and at step 309A, the bit delay line selects different delays for the individual bits of a skewed multi-bit data word. According to one embodiment, the delays selected are based on the calculations received in step 307A.

At step 309A, a de-skewed multi-bit data word is output. According to one embodiment, the de-skewed multi-bit data word may then be transmitted to a receiver (e.g., 103, FIG. 1) which may properly process the de-skewed data word.

The de-skewing process described above with reference to FIG. 3A enables multiple bit de-skewing over a broad range of skews (multiple bit-length skews). According to one embodiment, this is possible because the calculation of the skew delay of each bit of a multi-bit word is referenced to a single training data word position from which multiple-bit skew lengths may be measured. From the single training data word position the delay skew of each data bit of a multi-bit data word in a parallel bit-line data bus (e.g., 105) may be calculated.

Figure 3B:
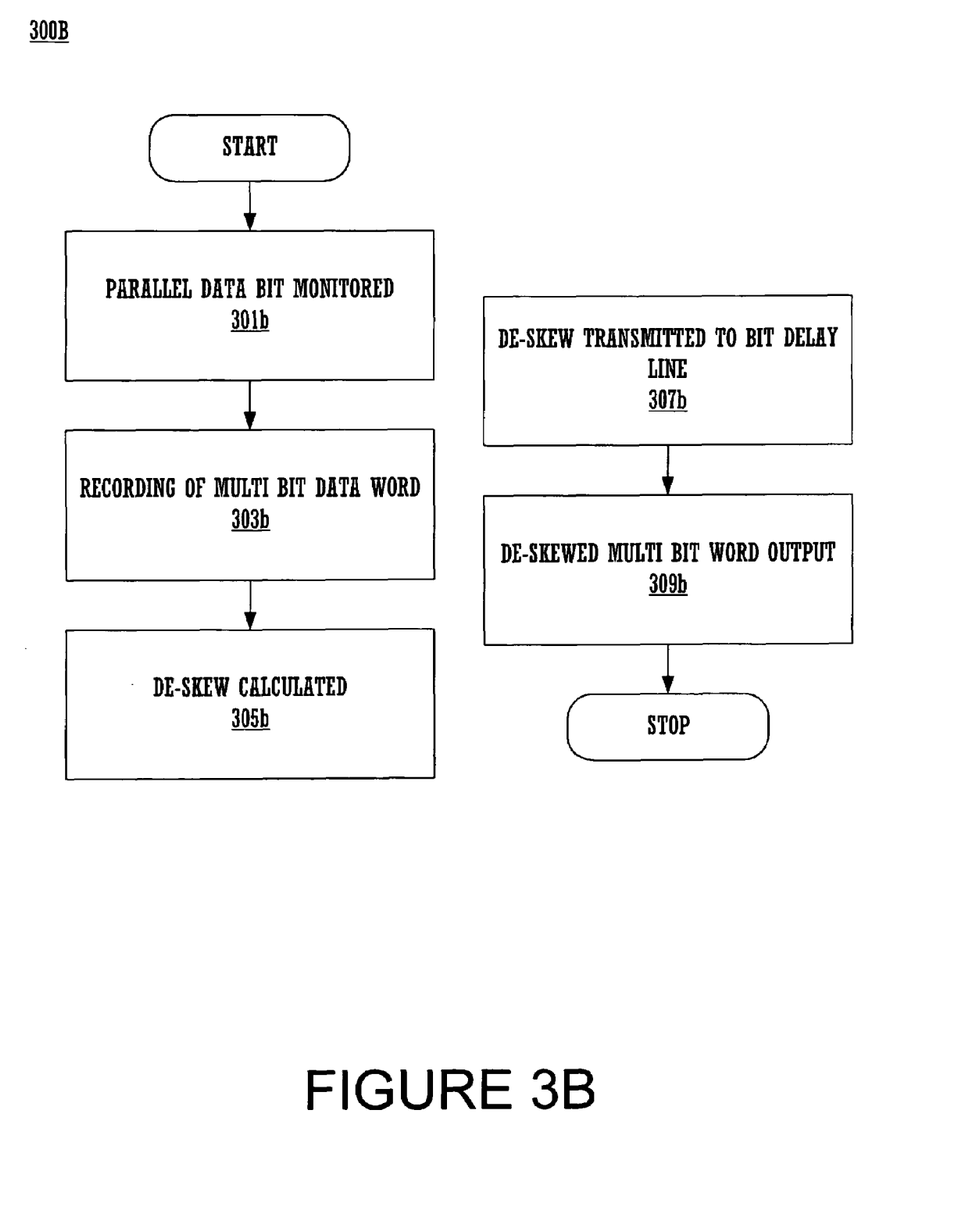
FIG. 3B is a flowchart 300B of steps performed in a computer controlled method for calculating skew based on a training control pattern according to an alternate embodiment of the present invention.

FIG. 3B is a flowchart 300B of the steps performed in a computer controlled method for calculating skew based on a training control pattern according to an alternate embodiment of the present invention. In the embodiment of FIG. 3B de-skewing is performed without the use of a delay buffer.

At step 301B, a parallel bit data bus is monitored for the first word of a training control pattern. According to this embodiment, once the training control pattern is detected the skewed data bits of multi-bit words may be determined on a word by word basis. It should be appreciated that according to this embodiment, instead of a buffer snapshot, the data path (parallel bus) is dynamically monitored, and the skew delay calculation is performed based on moving data. The first word (training control word) of the training pattern provides a reference from which a skew contour of skewed bits of a multi-bit word may be established and calculated.

At step 303B, upon detection of a first training data word of a training pattern, the number of bits needed to de-skew each bit of the corresponding multi-bit word is calculated at step 305B. According to one embodiment, this calculation may be based on the amount of delay that exists between a detection of a training data word position of the training control pattern and the locations of the zero to one or one to zero transitions of parallel data bits of the parallel bit word made prior to the detection of the training data word position. This per bit calculation allows a multiple bit de-skewing of skewed data words per clock.

At step 307B, the information calculated in step 305B is transmitted to the bit delay line, and at step 309B, the bit delay line selects different delays for the individual bits of the skewed data word. The delays selected are based on the calculations received in step 307B.

At step 309B, a de-skewed multi-bit data word is output. According to one embodiment the de-skewed multi-bit data word may be transmitted to a receiver (e.g., 103) which may then properly process the de-skewed multi-bit data word.

The de-skewing processes described herein with reference to FIG. 3B enable multiple bit de-skewing over a broader range of skews (multiple bit length skews) than is possible with single bit de-skewing. This is possible because the calculation of the skew for each bit of a multiple bit data word is referenced to a single training pattern word position. From the training pattern word position the delay skew of a multi-bit data word may be determined.

Figure 4:
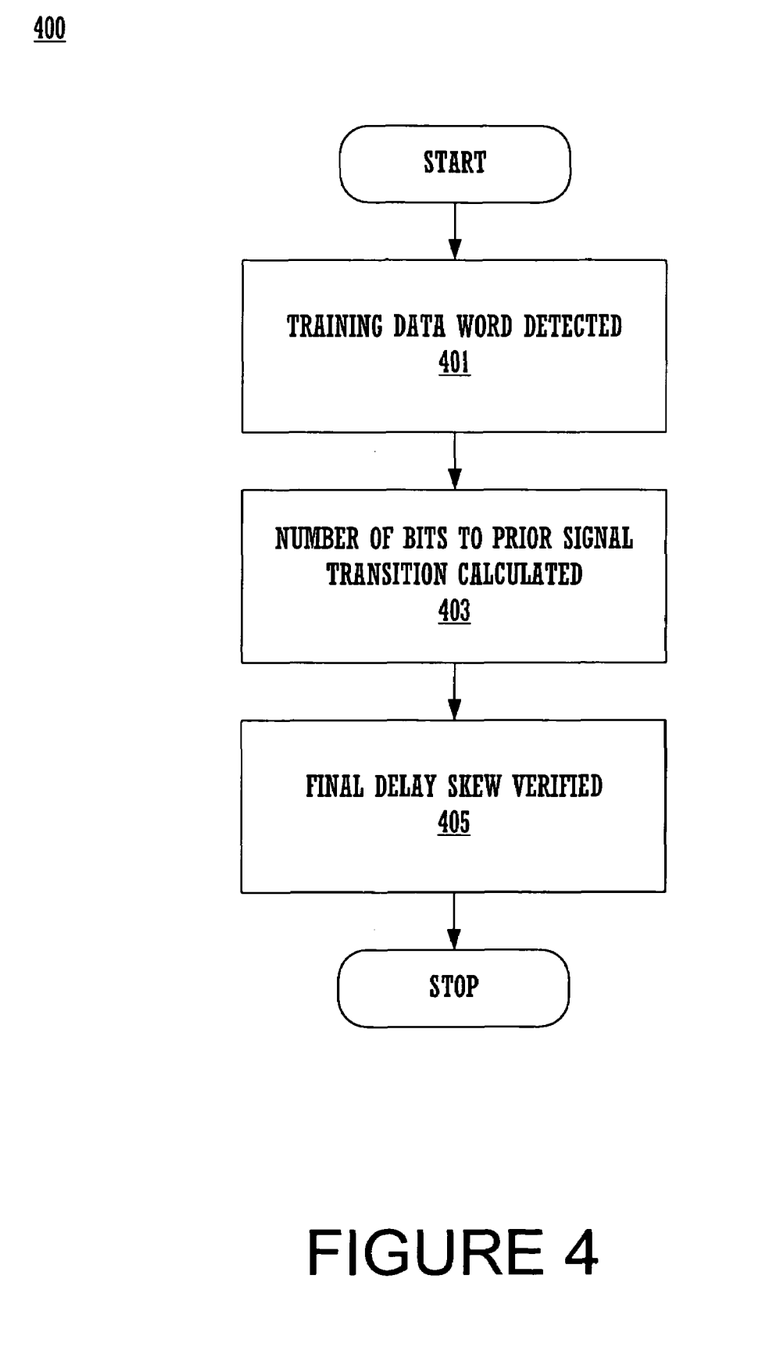
FIG. 4 is a flowchart of a computer-controlled method of calculating the delay skew per bit of each bit of a multi bit word in a parallel data bus according to one embodiment of the present invention.

FIG. 4 is a flowchart 400 of steps performed in a computer controlled method of calculating the delay skew per bit of each bit of a multi-bit data word transmitted in a parallel bit-line data bus according to one embodiment of the present invention. At step 401, a first training data word position is detected. The detection of the first data word position triggers the calculation of the skew delay. According to one embodiment, the calculation is based on a snapshot of the contents of a delay buffer. In an alternate embodiment, instead of a buffer snapshot the data path (parallel bus) is dynamically monitored and the skew delay calculation is based on continuously moving data.

At step 403, the number of bits from the detected training data word position to the signal transition occurring just prior to its detection is calculated for each transmitted data bit of a multi-bit data word. The signal transition occurring just prior to the detection of the training data word position may be either a one to zero or zero to one transition. This operation yields a calculated delay skew per bit for each bit of a parallel bit-line bus transmitted multi-bit data word.

At step 405, the final delay skew per bit of the skewed data word is verified. This is accomplished by verifying if the delay skew per bit calculated in step 403 matches a skew calculated following the detection of a last training data word position.

Through the above described process, embodiments of the present invention enable a final skew delay to be ascertained by: (1) establishing the presence of single or multiple bit skew; (2) performing a per bit calculation of the multiple bit skew; and (3) verifying the multiple bit skew. These operations are described below with reference to FIG. 6.

Figure 5:
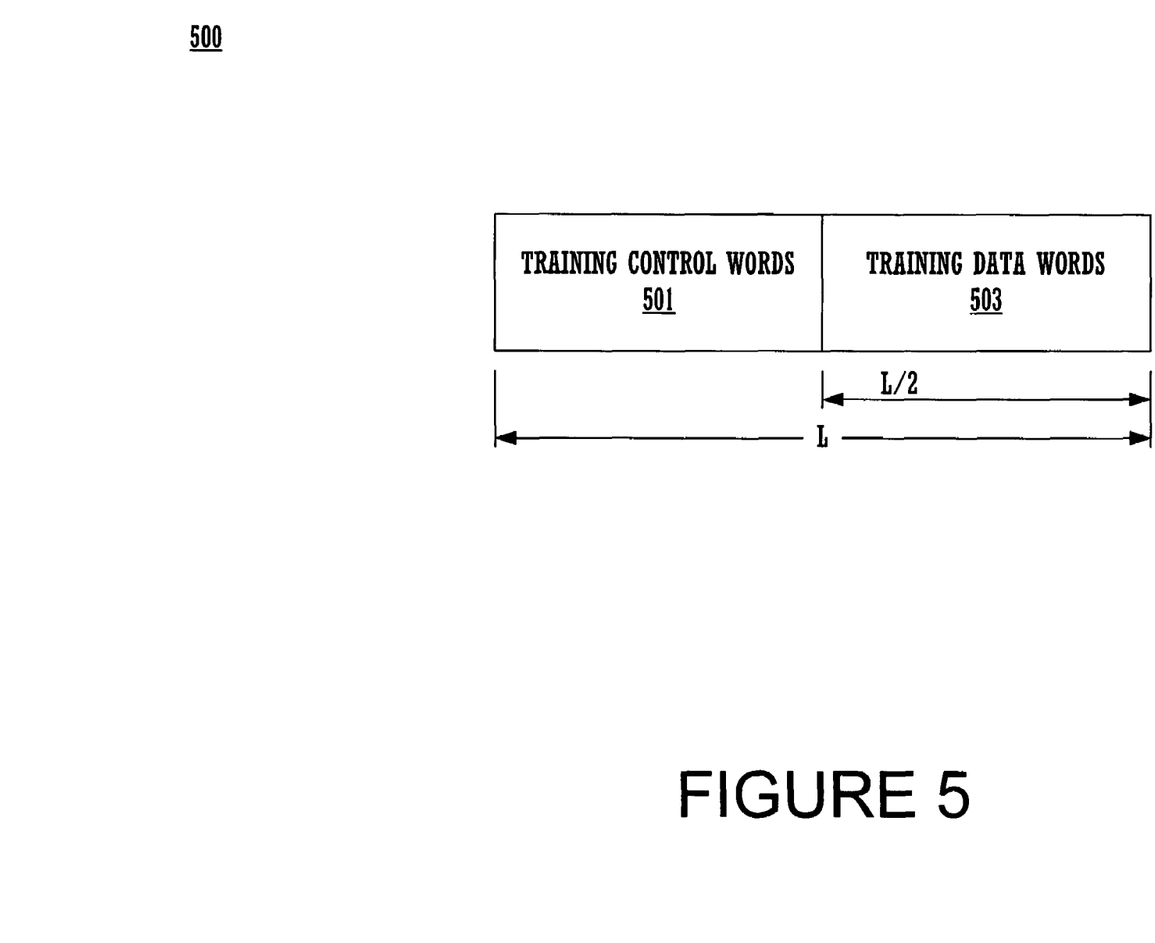
FIG. 5 is a diagram that illustrates the structure of a training pattern according to one embodiment of the present invention.

FIG. 5 is a diagram that illustrates an exemplary structure of a training pattern 500 according to one embodiment of the present invention. In one embodiment, training pattern 500 includes training control words 501 and training data words 503. The training control pattern 500 consists of 16 repeated sequences of training control words 501 followed by 16 repeated sequences of training data words 503. It should be appreciated that the training data words 501 are the complements of the training control words 503 and, according to one embodiment, may be related as first and second halves of the same training data pattern. According to exemplary embodiments, the training control words 501 and the training data words 503 provide a reference from which data skew may be established, calculated, and verified. It should be appreciated that the length of the training control pattern may be equal to L words (see FIG. 5), which corresponds to the minimum number of data words that may be contained by the delay buffer (e.g., 201, of FIG. 2) when the training control pattern is detected. This process is illustrated with reference to FIG. 6 below.

Figure 6:
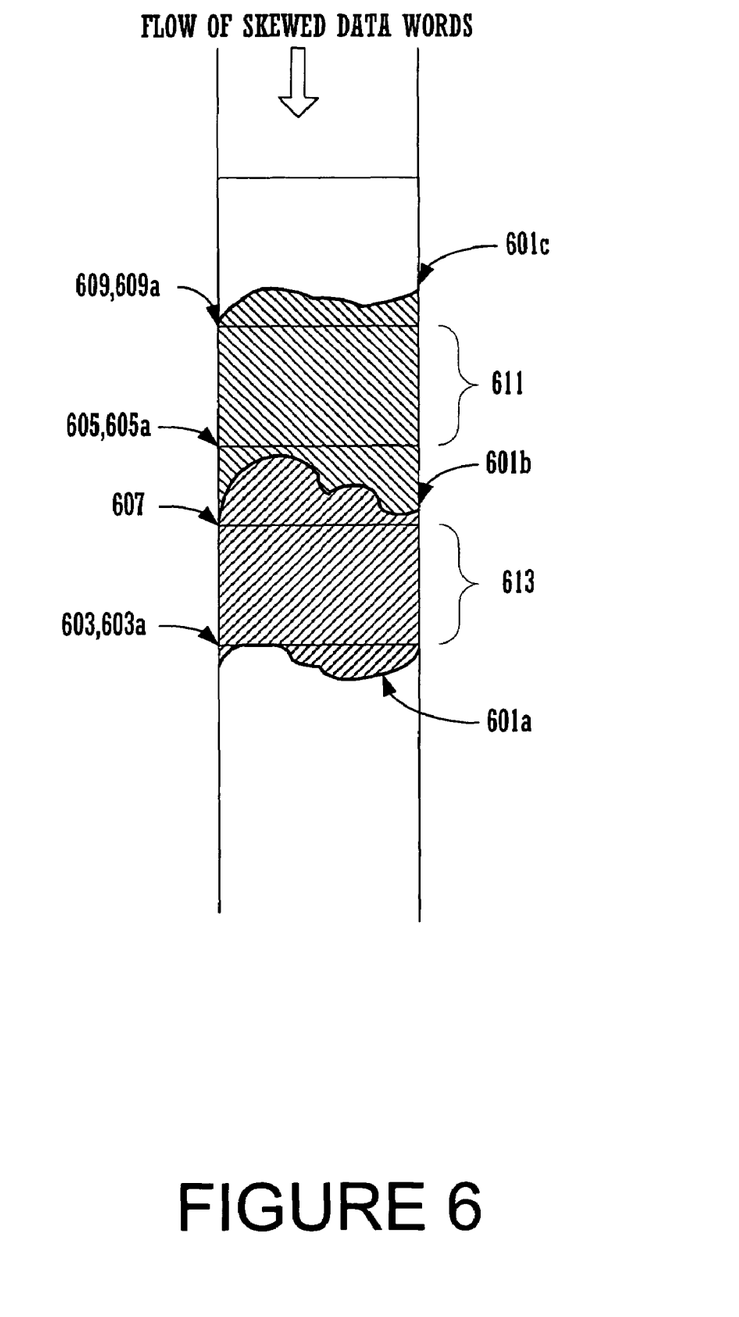
FIG. 6 illustrates the use of a training data pattern in the determination of the delay skew per bit of each data bit of a multi-bit word in a parallel bus according to one embodiment of the present invention.

FIG. 6 illustrates the use of a training data pattern in the determination of the delay skew per bit of each data bit of a multi-bit data word in a parallel bit-line data bus according to one embodiment of the present invention. As previously mentioned, with reference also to FIG. 5, a training data pattern (e.g., 500) may include training control words (e.g., 501) and training data words (e.g., 503) that facilitate the establishing, calculating and verifying of the delay skew per bit of each bit of a multi-bit data word in a parallel bit-line data bus. Referring to FIG. 6, there is shown skew contour relative to first training control word position 601A, skew contour relative to first training data word position 601B, skew contour relative to last training data word position 601C, first detected training control word position 603, first detected training control word 603A, first detected training data word position 605, first detected training data word 605A, complement reference position 607, last detected training data word position 609, last detected training data word 609A, matched data pattern 611, and matched control pattern 613.

Referring to FIG. 6, the skew contour relative to the first training control word position 601A is a representation of the delay skew exhibited by a multi bit data word transmitted in a parallel bit-line data bus. At very high speed, data bits in a parallel bit-line data bus may exhibit significant skew. Therefore, substantial data de-skewing may be required at the receiver before any processing of the data is performed.

The skew contour relative to the first training control word position 601A may be established with the detection of the first training control word position 603. The first detected training control word position provides a reference from which a skew contour may be established. The skew contour relative to the first training control word position 601A is a representation of the per bit skew delay of a multi-bit data word. It represents the amount of delay that exists between a training control word position and the locations of the zero to one or one to zero transitions of the parallel transmitted data bits of a multi-bit data word made just prior to the detection of the training control word. The first training control word position 603 may dictate the first training data word position 605, because training control words and training data words may be related as first and second halves of the same training data pattern. According to one embodiment, the first detected training control word 603A is the first of a sequence of 16 control words (e.g., matched control pattern) that is followed by a second sequence of 16 data words (e.g., matched data pattern). The first detected training data word 605A is the first word of the second sequence of 16 data words. It should be appreciated that the two sequences may be related as complements. However, according to other embodiments the training pattern may be structured to consist of any fixed ratio of training control and training data words.

The first detected training data word position 605 is used as a reference from which a per bit calculation of the delay skew of each data bit of a multi-bit data word in a parallel bit line bus may be made. This calculation provides a measure of the skew contour 601B relative to a first detected training data word position 605. However, because the first detected training data word 605A may be the complement of the first detected training control word 603A, the calculation of the delay skew using the training data word 605A provides a calculated measure of the skew delay from a complemented (re-oriented relative to the first detected training control word) reference position 607. Orienting the skew measurement in this manner facilitates a direct comparison (for verification purposes) of the skew thusly calculated, with the skew contour 601C relative to the last training data word position 609, which may be determined from bit transitions made subsequent to the detection of a last training data word 609A. This is important because according to one embodiment, the skew verification process may involve the comparison of bit transitions that occur prior to the detection of the first data training word 605A with bit transitions that occur subsequent to the detection of the last data training word 609A (see FIG. 6). Without the complementing operation, the measurements that are compared may have different polarities.

Last detected training word position 609 is used to generate a measure of skew that may be compared with that calculated from training word position 605. Matching calculations of skew made with respect to word positions 605 and 609 provide corroborating verification of skew delay. It should be appreciated that the skew measured form the last training data word position 609 represents the amount of delay that exists between the last detected training data word position and the locations of the zero to one or one to zero transitions of data bits of a multi-bit data word made subsequent to the detection of the last training data word position 609. By comparing the skew measured from the first data training word position 605 with that measured from the last data training word position 609, a final delay skew may be verified.

Matched control pattern 613 indicates the region of the training control pattern corresponding to a sequence of training control words. The detection of the first training control word position 603 provides a reference from which a skew contour of a multi-bit data word may be established.

Matched control pattern 611 indicates the region of the training control pattern corresponding to a sequence of training data words. The detection of the first training data word position 605 provides a reference from which the skew of a multi-bit data word may be calculated.

Figure 7:
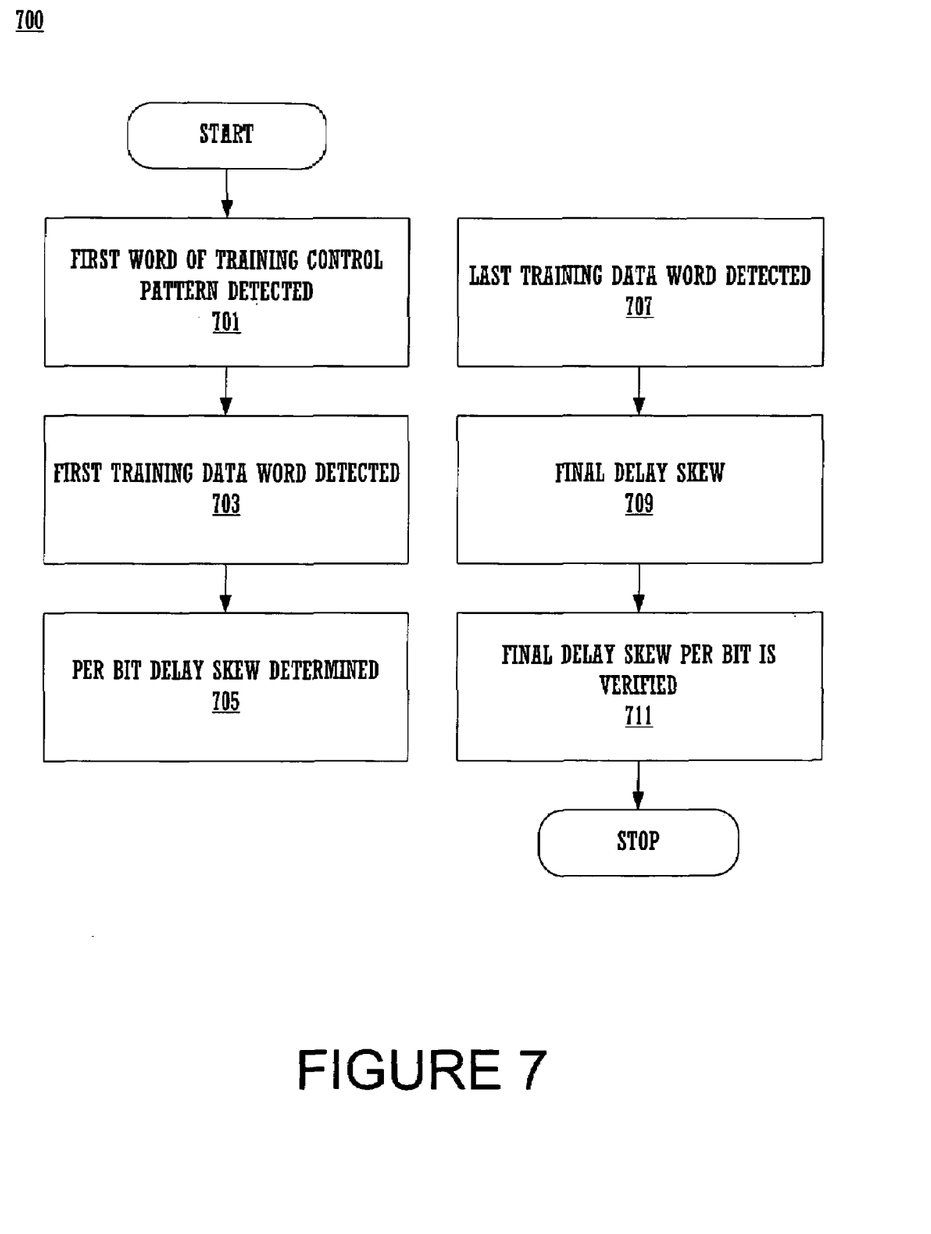
FIG. 7 is a flowchart of a computer-controlled method for using a training pattern to determine delay skew as described above with reference to FIG. 6, according to one embodiment of the present invention.

FIG. 7 is a flowchart 700 of the steps performed in a computer controlled method for using a training pattern to determine delay skew as described above with reference to FIG. 6 according to one embodiment of the present invention. According to exemplary embodiments, a training pattern may be used to establish, calculate and verify skew delay.

At step 701, a first word of a training control pattern is detected. The control word position provides a reference from which a skew contour may be established. The skew contour is a representation of skew delay. It represents amount of delay that exists between a control word position and the locations of the zero to one or one to zero transitions of parallel data bits of a multi bit data word made just prior to the detection of the control word position. The first detected control word position may be related to the position of the first detected training data word. This is because control words and data words may be related as comprising first and second halves of the same training data pattern.

At step 703, a first training data word is detected. The first detected training data word position 705 may be used as a reference from which a per bit calculation of the delay skew of parallel bits of a second multi bit data word may be made (see FIG. 4 discussion above).

At step 705, a per bit calculation of the delay skew of parallel bits of a second multi bit data word is determined. Because the first detected training data word may be the complement of the first detected training control word, the calculation of the delay skew using the complement provides a measure of the skew delay from a complemented (re-oriented) reference position. Orienting the skew measurement in this manner facilitates a direct comparison of the skew thus determined, with the skew determined by measuring the delay between the detection of the last training data word and subsequent bit transitions of a multi bit data word.

At step 707, the last training data word is detected. Last detected training word position (e.g., 609, FIG. 6) is used as a reference from which a per bit calculation of the delay skew of parallel bits of a third multi bit data word may be made.

At step 709, a per bit calculation of the delay skew of parallel bits of a third multi bit data word is determined. It represents the amount of delay that exists between the last detected training data word position and the locations of the zero to one or one to zero transitions of parallel data bits of a third multi-bit data word transmitted in a parallel bitline data bus made subsequent to the detection of the last data word position.

At step 711, a final delay skew per bit is verified. By comparing the skew calculated after the first detected data training word position with that measured after the last detected training data word position a final delay skew may be verified.

Exemplary Hardware in Accordance With Embodiments of the Present Invention

Figure 8:
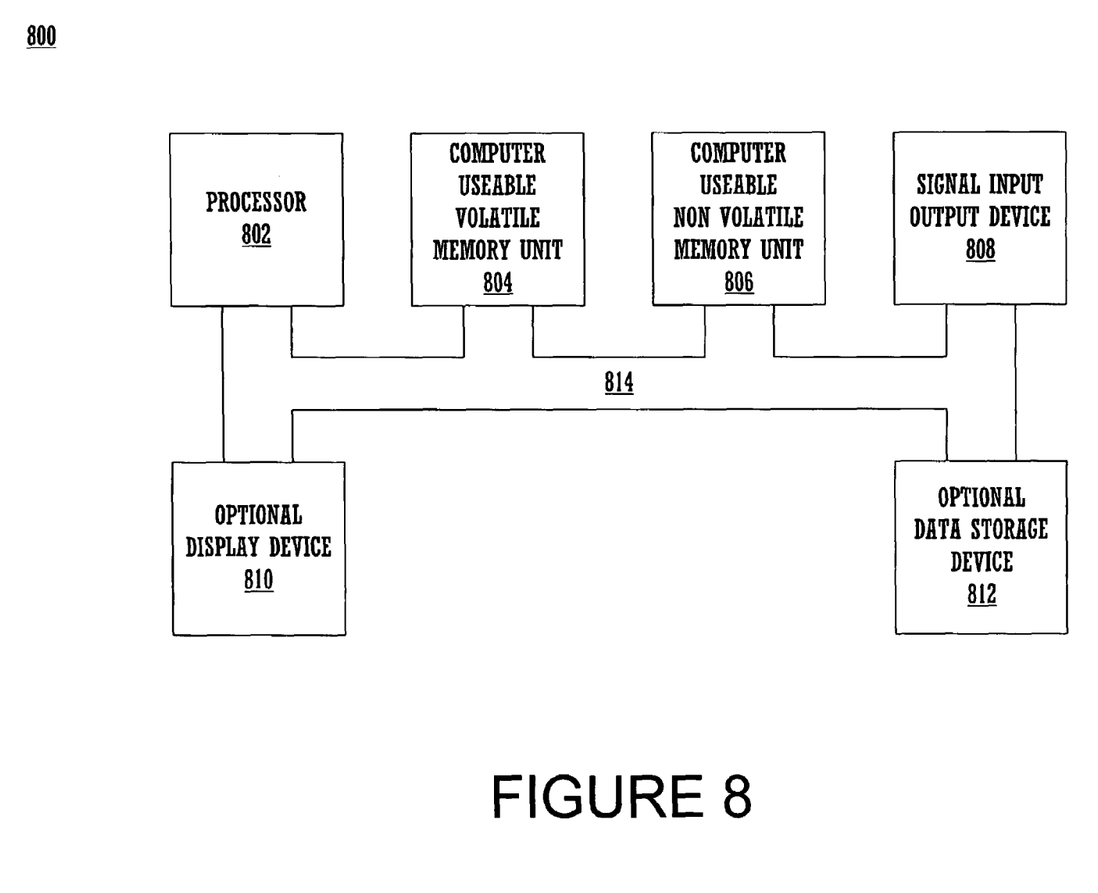
FIG. 8 is a block diagram of an embodiment of an exemplary computer system upon which embodiments of the present invention may be implemented in accordance with the present invention.

FIG. 8 is a block diagram of an embodiment of an exemplary computer system 800 used in accordance with the present invention. It should be appreciated that system 800 is not strictly limited to be a computer system. As such, system 800 of the present embodiment is well suited to be any type of computing device (e.g., server computer, portable computing device, embedded system, etc.). Within the following discussions of the present invention, certain processes and steps are discussed that are realized, in one embodiment, as a series of instructions (e.g., software program) that reside within computer readable memory units of computer system 800 and executed by a processor(s) of system 800. When executed, the instructions cause computer 800 to perform specific actions and exhibit specific behavior that is described in detail below.

In particular, the herein described computer controlled functions such as monitoring the parallel bit-line bus or a delay buffer for a first control word of the training pattern, and calculating the number of bits needed to de-skew each data bit of a multi bit data word in each bit-line of the parallel bus may be realized, in one embodiment, as a series of instructions (e.g., software program) that reside within computer readable memory units of computer system 800 and are executed by a processor(s) of system 800. When executed, the instructions cause computer 800 to monitor the parallel bit line bus or delay buffer for a first control word of the training pattern, and calculate the number of bits needed to de-skew each data bit of a multi bit data word in each bit-line of the parallel bus as is described herein.

Computer system 800 of FIG. 8 comprises an address/data bus 814 for communicating information, one or more central processors 802 coupled with bus 814 for processing information and instructions. Central processor unit 802 may be a microprocessor or any other type of processor. The computer 800 also includes data storage features such as a computer usable volatile memory unit 804 (e.g., random access memory, static RAM, dynamic RAM, etc.) coupled with bus 814 for storing information and instructions for central processor(s) 802, a computer usable non-volatile memory unit 806 (e.g., read only memory, programmable ROM, flash memory, EPROM, EEPROM, etc.) coupled with bus 814 for storing static information and instructions for processor(s) 802. System 800 also includes one or more signal generating and receiving devices 808 coupled with bus 814 for enabling system 800 to interface with other electronic devices. The communication interface(s) 808 of the present embodiment may include wired and/or wireless communication technology. For example, in one embodiment of the present invention, the communication interface 808 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 800 can also include a computer usable mass data storage device 812 such as a magnetic or optical disk and disk drive (e.g., hard drive or floppy diskette) coupled with bus 814 for storing information and instructions. An optional display device 810 is coupled to bus 814 of system 800 for displaying video and/or graphics.

As noted above with reference to exemplary embodiments thereof, the present invention provides for multi-bit de-skewing of parallel bus signals. The method includes receiving data comprising a multi-bit word and a training pattern, monitoring the received data for a first control word of the training pattern, detecting a first control word of the training pattern, calculating the number of bits needed to de-skew each data bit of a multi-bit data word in each bit-line of a parallel bus, and transmitting the number of bits needed to de-skew each data bit of a multi-bit data word in each bit-line of the parallel bus to a bit delay line. The system then outputs a de-skewed data word.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for de-skewing of parallel bus signals comprising:
   receiving data comprising a multi-bit word and a training pattern;
   detecting a first control word of the training pattern;
   calculating a number of bits needed to de-skew each data bit of a multi-bit data word in each bit-line of a parallel bus;
   transmitting the number of bits needed to de-skew each data bit of a multi-bit data word in each bit-line of the parallel bus to a bit delay line; and
   outputting a de-skewed data word.

2. The method of claim 1, wherein said de-skewing involves single bit de-skewing.

3. The method of claim 2, wherein said de-skewing involves multiple bit de-skewing.

4. The method of claim 1, wherein a position of a training control word that is detected provides a reference from which skew is established and a position of a training data word that is detected provides a reference from which a per bit calculation of a delay skew of data bits in a parallel bus is made.

5. The method of claim 4, wherein the per bit calculation of delay skew is made by calculating the number of bits from a detected training data word position to a signal transition occurring prior to detection of the training data word.

6. The method of claim 5, wherein a final delay skew per bit is verified by comparing the skew measured after a first detected data training word position with that measured after a last detected training data word position.

7. The method of claim 1, further comprising:
   receiving the multi-bit data word and training pattern into a delay buffer; and
   recording a contents of the delay buffer upon the detection of a first control word of the training pattern.

8. A computer useable medium having computer useable code embodied therein causing a computer to perform operations comprising:
   receiving data comprising a multi-bit word and a training pattern;
   detecting a first control word of the training pattern;
   calculating a number of bits needed to de-skew each data bit of a multi-bit data word in each bit-line of the parallel bus;
   transmitting the number of bits needed to de-skew each data bit of a multi-bit data word in each bit-line of the parallel bus to a bit delay line; and
   outputting a de-skewed data word.

9. The computer useable medium of claim 8, wherein said de-skewing involves single bit de-skewing.

10. The computer useable medium of claim 9, wherein said de-skewing involves multiple bit de-skewing.

11. The computer useable medium of claim 10, wherein a position of a training control word that is detected provides a reference from which skew is established and a position of a training data word that is detected provides a reference from which a per bit calculation of a delay skew of data bits in a parallel bus is made.

12. The computer useable medium of claim 11, wherein the per bit calculation of delay skew is made by calculating the number of bits from a detected training data word position to a signal transition occurring prior to detection of the training data word.

13. The computer useable medium of claim 12, wherein a final delay skew per bit is verified by comparing the skew measured after a first detected data training word position with that measured after a last detected training word position.

14. The computer useable medium of claim 8, further comprising:
   receiving the multi-bit data word and training pattern into a delay buffer; and
   recording a contents of the delay buffer upon the detection of a first control word of the training pattern.

15. A computer controlled de-skewing system comprising:
   a bus;
   a computer readable memory units connected to said bus;
   a processor coupled to said bus said processor for executing a method for implementing an application comprising:
   receiving data comprising a multi-bit word and a training pattern;
   detecting a first control word of the training pattern;
   calculating a number of bits needed to de-skew each data bit of a multi-bit data word in each bit-line of the parallel bus;
   transmitting the number of bits needed to de-skew each data bit of a multi-bit data word in each bit-line of the parallel bus to a bit delay line; and
   outputting a de-skewed data word.

16. The computer controlled de-skewing system of claim 15, wherein said de-skewing involves single bit de-skewing and multiple bit de-skewing.

17. The computer controlled de-skewing system of claim 16, wherein a position of a training control word that is detected provides a reference from which skew is established and the position of a training data word that is detected provides a reference from which a per bit calculation of the delay skew of data bits in a parallel bus is made.

18. The computer controlled de-skewing system of claim 17, wherein the per bit calculation of delay skew is made by calculating the number of bits from a detected training data word position to a signal transition occurring prior to detection of the training data word.

19. The computer controlled de-skewing system of claim 18, wherein a final delay skew per bit is verified by comparing the skew measured after a first detected data training word position with that measured after a last detected training word position.

20. The computer controlled de-skewing system of claim 19, further comprising:
   receiving the multi-bit data word and training pattern into a delay buffer; and
   recording a contents of the delay buffer upon the detection of a first control word of the training pattern.

* * * * *